United States Patent [19]
Yeo

[11] Patent Number: 6,130,617
[45] Date of Patent: Oct. 10, 2000

[54] DRIVER'S EYE DETECTION METHOD OF DROWSY DRIVING WARNING SYSTEM

[75] Inventor: Jung-hack Yeo, Kyungki-do, Rep. of Korea

[73] Assignee: Hyundai Motor Company, Seoul, Rep. of Korea

[21] Appl. No.: 09/328,774

[22] Filed: Jun. 9, 1999

[51] Int. Cl.⁷ .................................................. G08B 13/18
[52] U.S. Cl. .......................... 340/575; 340/576; 382/117; 382/118; 382/203; 382/291; 351/206; 351/209; 351/246; 600/558
[58] Field of Search .................................... 340/576, 575; 382/117, 203, 118, 291; 351/209, 246, 206; 600/558

[56] References Cited

U.S. PATENT DOCUMENTS

| | | | |
|---|---|---|---|
| 5,570,698 | 11/1996 | Liang et al. .............................. | 600/558 |
| 5,689,241 | 11/1997 | Clarke, Sr. et al. ..................... | 340/575 |
| 5,867,587 | 2/1999 | Aboutalib et al. ...................... | 382/117 |
| 5,878,156 | 3/1999 | Okumura ................................ | 382/118 |
| 5,912,721 | 6/1999 | Yamaguchi et al. .................... | 351/210 |
| 5,960,099 | 9/1999 | Hayes, Jr. et al. ...................... | 382/118 |
| 5,995,639 | 11/1999 | Kado et al. .............................. | 382/118 |

*Primary Examiner*—Benjamin C. Lee
*Attorney, Agent, or Firm*—Christie, Parker & Hale, LLP

[57] ABSTRACT

An eye detection method of a drowsy driving alarming system comprises the steps of: binarizing a driver's face image from a CCD camera, extracting candidate areas existing in pair into a binary face image, determining one candidate pair from among the candidate pairs as nostrils, setting the remained candidate pairs forming equilateral triangles in relation with the nostrils as eye candidate pairs, and determining a candidate pair forming the smaller equilateral triangle to be the driver's eyes.

4 Claims, 2 Drawing Sheets

DRIVER'S EYE DETECTION METHOD OF DROWSY DRIVING WARNING SYSTEM

BACKGROUND OF THE INVENTION (a) Field of the Invention

The present invention relates to a drowsy driver warning system and, more particularly, to a driver's eye detection method for judging whether the driver is drowsy or not.

(b) Description of the Related Art

Recently, much research and development has been conducted on advanced safety vehicle (ASV) for preventing road accidents and minimizing damage when collisions occur. The basic concept of the ASV is a safety-guarantee and an accident-preventive vehicle. Too achieve these objectives, many safety technologies are adapted in ASV. These technologies includes the drowsy driving warning system, nighttime pedestrian monitoring and warning system fire alarm system, and so on.

Among them, the drowsy driving warning system helps prevent accidents caused by drowsy drivers at the wheel by means of sounding an alarm shaking the seat, increasing the audio volume, or emitting a strong stimulating gas. Thus, prior to activating the alarm, there is need to monitor the driver's condition and judge whether he is drowsy or not.

Such a drowsiness detecting system uses image-processing technology to analyze images of the driver's face, particularly his eyes, taken with a CCD camera Thus, the extraction of the eyes of a driver is very important and if the system fails to detect the driver's eyes, it is impossible to judge whether the driver is drowsy or not.

SUMMARY OF THE INVENTION

The present invention has been made in an effort to solve the above problems.

It is an object of the present invention to provide a method for correctly detecting the driving condition of the driver from the face image taken by a CCD camera.

To achieve the above object, a driver's eye detection method according to the present invention comprises the steps of binarizing a driver's face image input from a CCD camera, extracting candidate areas existing in pairs into a binary face image, determining one candidate pair from among the candidate pairs as nostrils, setting the remained candidate pairs forming equilateral triangles in relation with the nostrils as eye candidate pairs, and establishing the candidate pair forming the smaller equilateral triangle as the driver's eyes.

BRIEF DESCRIPTION OF THE DRAWINGS

The accompanying drawings, which are incorporated in and constitute a part of the specification, illustrate an embodiment of the invention, and, together with the description serve to explain the principles of the invention.

DETAILED DESCRIPTION OF THE PREFERRED EMBODIMENTS

Preferred embodiment of the present invention will be described in detail with reference to the accompanying drawings.

Figure 1:
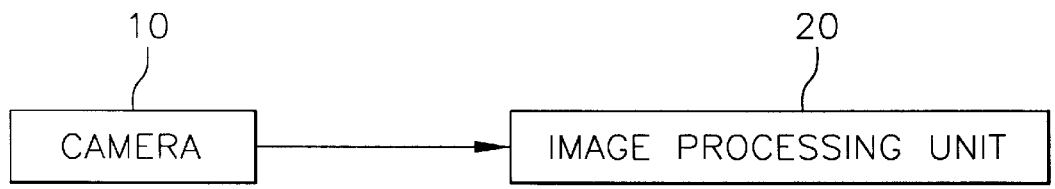
FIG. 1 is a block diagram illustrating a structure of an eye detection apparatus according to a preferred embodiment of the present invention.

FIG. 1 is a block diagram that shows a structure of the driver's eye detection apparatus according to the preferred embodiment to the present invention. As shown in FIG. 1, the eye detection apparatus comprises a CCD camera 10 for taking and image of the driver's face and an image processing unit 20.

The CCD camera 10 monitors the driver's face and sends continuously captured image signals to the image processing unit 20. The image processing unit 20 analyzes the image signals and extracts image of the driver's eyes and determines whether the driver is drowsy or not on the basis of the results of an analysis.

Figure 2:
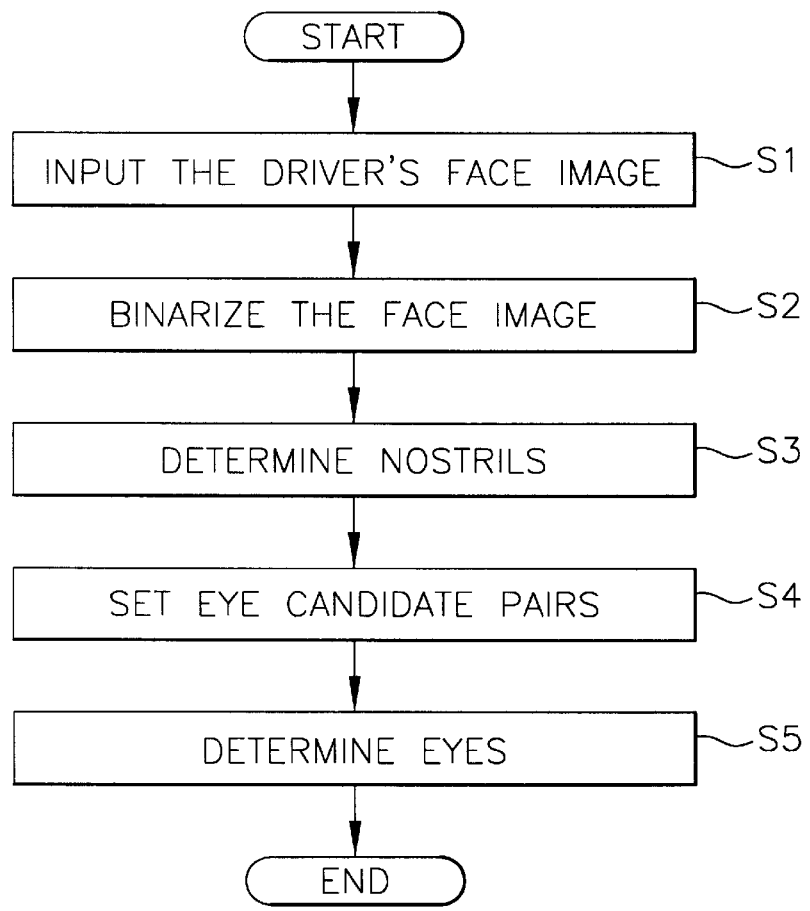
FIG. 2 is a flow chart illustrating the eye detection method of the drowsy driving warning system according to the preferred embodiment of the present invention.
Figure 3:
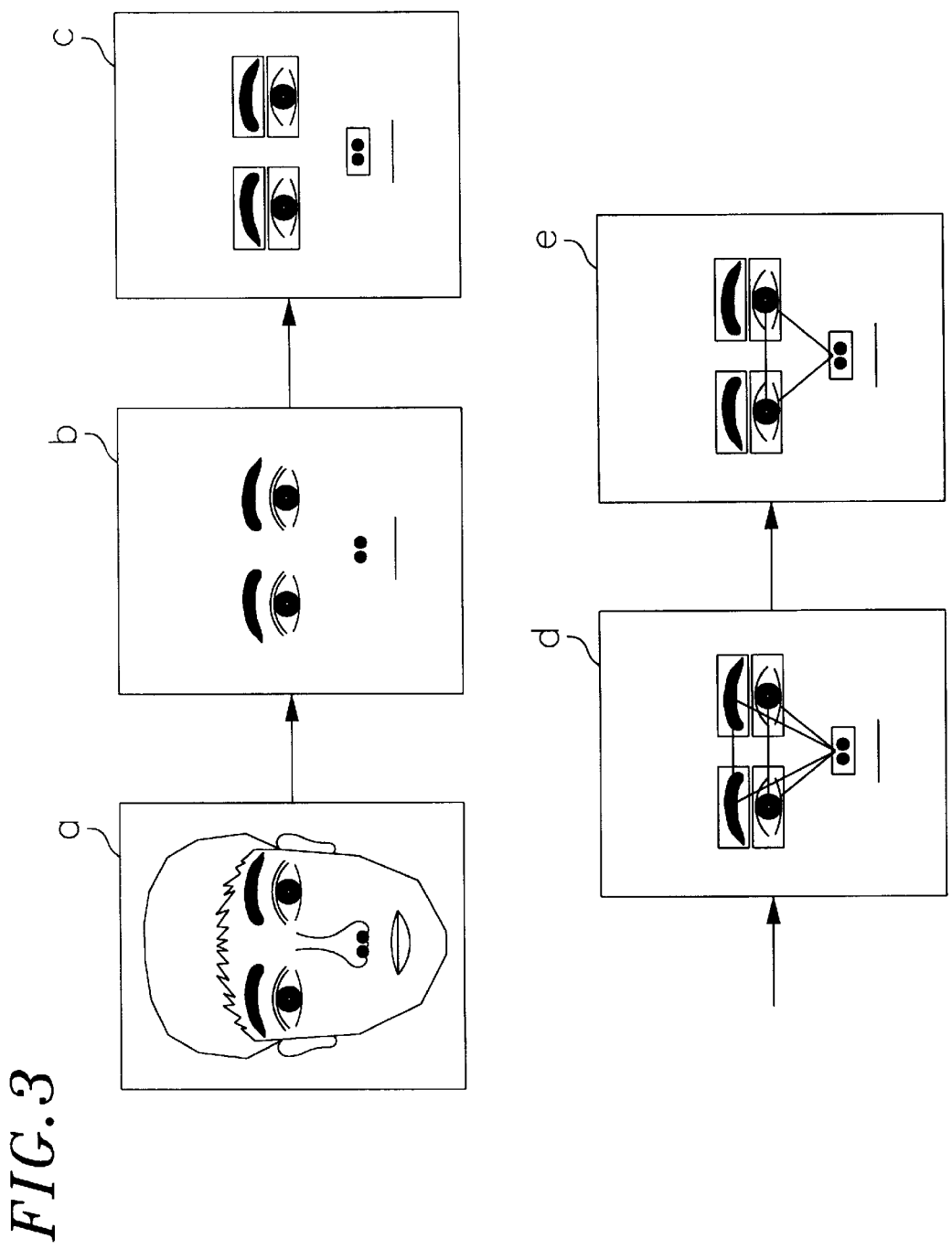
FIG. 3 is a procedural sketch showing the procedure with which eye detection is performed from a gray level image taken with a CCD camera according to the preferred embodiment of the present invention.

FIG. 2 and FIG. 3 are respectively a flow chart illustrating the eye detection method of the present invention and a procedural sketch showing procedure with which eye detection is performed.

An eye detection method according to the preferred embodiment of the present invention will now be described with reference to the accompanying drawings FIG. 2 and FIG. 3.

The driver's face image taken with the CCD camera 10 is input to the image processing means 20 in gray level as per sketch a of FIG. 3 in step S and the gray level image is binarized by means of threshold filtering in which pixels having black level similar to that of eyes are designated as "1"s and the other pixels are designated as "0"s. Then, the image processing means 20 extracts black level areas from the binary face image such that the characteristic feature areas such as eyes, eyebrows, nostrils, and the line between the lips are extracted as shown in sketch b of FIG. 3 in step S2. Consequently, the image processing unit 20 selects black area from the binary image of sketch b of FIG. 3 and sets areas existing in pairs as candidate pairs thereby resulting in three candidate pair as shown in sketch c of FIG. 3. Next, the image processing unit 20 determines that the one candidate pair in which its two black areas positioned most closely to each other are nostrils in step S3. Once the nostrils are determined, the image processing unit 20 produces two imaginary equilateral triangles which are formed by connecting a middle point between the nostrils and each central point of both black areas of each candidate pair, and then establishes the two candidate pairs forming the two equilateral triangles as eye candidate pair as shown in sketch d of FIG. 3 in step S4. Finally, the image processing unit 20 selects the smaller equilateral triangle and determines the candidate pair associated with the smaller equilateral triangle as the driver's eyes as shown in sketch e of FIG. 3 in step S5.

In this preferred embodiment of the present invention, the image of the driver's eyes can be accurately extracted from his face image as explained above such that the reliability of eye detection is enhanced, resulting in more accurate assessment as to whether the driver is drowsy or not.

Other embodiments of the invention will be apparent to the skilled in the art from consideration of the specification and practice of the invention disclosed herein. It is intended that the specification be considered as exemplary only, with the true scope and spirit of the invention being indicated by the following claims.

What is claimed is:

1. An eye detection method of a drowsy driving alarming system comprising the steps of:

binarizing a driver's face image input from a CCD camera;

extracting candidate areas existing in pair into a binary face image;

determining one candidate pair from among the candidate pairs as nostrils;

establishing the remained candidate pairs forming equilateral triangles in relation with the nostrils as eye candidate pairs; and determining a candidate pair forming the small equilateral triangle as the driver's eyes.

2. An eye detection method of claim 1 wherein the binarization of the driver's face image is achieved by means of threshold filtering in which pixels having black level similar to that of eyes are designated as "1"s and the other pixels are designated as "0"s.

3. An eye detection method of claim 1 wherein from among candidate pairs one candidate pair in which its two black areas positioned most closely to each other is determined to be nostrils.

4. An eye detection method of claim 1 wherein a pair forming the smaller equilateral triangle is determined as the driver's eyes.

* * * * *